United States Patent [19]

Kiyoura et al.

[11] Patent Number: 5,757,748
[45] Date of Patent: May 26, 1998

[54] AUTOMATIC GAIN CONTROL APPARATUS FOR OPTICAL DISC PLAYER

[75] Inventors: Kazuhiro Kiyoura; Yoshifumi Fujino; Yoshimichi Nishio; Takeshi Matsumoto; Mayumi Takahashi; Koichiro Haraguchi, all of Kawagoe, Japan

[73] Assignee: Pioneer Electronic Corporation, Tokyo, Japan

[21] Appl. No.: 766,876

[22] Filed: Dec. 13, 1996

[30] Foreign Application Priority Data

Dec. 22, 1995 [JP] Japan ................... 7-335522

[51] Int. Cl.[6] .................................... G11B 7/00
[52] U.S. Cl. ................... 369/44.29; 369/44.35; 369/124
[58] Field of Search .................. 369/124, 44.11, 369/58, 47, 54, 44.29, 44.35, 53, 116, 44.21, 60

[56] References Cited

U.S. PATENT DOCUMENTS 4,942,564  7/1990  Hofer et al. ................. 369/58
5,446,716  8/1995  Eastman et al. ............. 369/116 X Primary Examiner—Muhammad N. Edun
Attorney, Agent, or Firm—Finnegan, Henderson, Farabow, Garrett & Dunner, L.L.P.

[57] ABSTRACT

An automatic gain control apparatus for an optical disc player is equipped in a servo loop to perform a servo control by use of an error signal in the optical disc player. The apparatus is provided with: a gain control device for controlling a gain of the servo loop to have a controlled gain value corresponding to a signal level of the error signal in one series of automatic gain controlling operation; a memory for storing the controlled gain value as a previously controlled gain value in said one series of automatic gain controlling operation; a comparison device for comparing the previously controlled gain value, which is stored in the memory, with a presently controlled gain value of the gain of the servo loop, which is presently controlled by the gain control device in another series of automatic gain controlling operation after said one series of automatic gain controlling operation; and a controller for instructing the gain control device to control the gain of the servo loop again if a difference between the previously controlled gain value and the presently controlled gain value is not less than a predetermined value according to a comparison result of the comparison device in said another series of automatic gain controlling operation.

11 Claims, 7 Drawing Sheets

AUTOMATIC GAIN CONTROL APPARATUS FOR OPTICAL DISC PLAYER

BACKGROUND OF THE INVENTION

1. Field of the Invention

The present invention generally relates to a so-called automatic gain control apparatus used for servo controls such as a focusing servo control and a tracking servo control in an optical disc player such as a CD (Compact Disc) player, an LD (Laser disc) player, a DVD (Digital Video or Versatile Disc) player and so on.

2. Description of the Related Art

This kind of optical disc player is constructed to perform the servo control by a servo loop (closed circuit loop), such as a focusing servo control and a tracking servo control in the optical pickup for optically reading information, a spindle servo control in a spindle motor for rotating the optical disc and so on, in order to precisely read the information from a record track on the optical disc as a record medium. The servo control is performed by generating an error signal with respect to a predetermined type of signal inputted from the optical pickup, and controlling or adjusting the gain of the error signal in the servo loop to an appropriate level. For this purpose, the automatic gain control apparatus for controlling or adjusting the gain in accordance with the level of the input signal in the servo loop is utilized. Especially, the automatic gain control apparatus for performing the gain control by use of an external disturbance can appropriately control or adjust the gain value, so that it can realize a stable servo control in the reproduction of the optical disc by performing the automatic gain controlling operation to set the appropriate gain to the servo-system in advance of the actual reproduction of the optical disc.

According to the above mentioned automatic gain control apparatus, if the gain value set as the initial value for the automatic gain controlling operation in the servo loop is made constant regardless of aging of the apparatus, it becomes difficult or impossible to appropriately close the servo loop due to the aged deterioration of the apparatus and other causes. For this reason, the present inventors have proposed a technique to store the previously controlled (adjusted) gain value to a memory each time when the automatic gain controlling operation or the reproducing operation is finished, and to employ the stored gain value, which is the latest controlled gain value and in which the influence of aging is the minimum, as the initial value for the next (present) automatic gain controlling operation, in Japanese Patent Application Laying Open No. Hei. 7-130087. According to this technique, the servo can be relatively reliably closed with respect to various usage condition and aging.

However, according to this technique, once the automatic gain controlling operation is completed and the controlled (adjusted) gain value is obtained, the reproducing operation is started by use of this obtained gain value regardless of the validity thereof. Thus, there is a problem that, in a case of erroneous controlling or adjusting operation eventually generated due to the condition on the optical disc such as a dust and a scratch, the vibration of the rotated optical disc, setting-miss of the optical disc and so on, or in a case of erroneous controlling or adjusting operation due to an electrical or mechanical failure of the apparatus (e.g. CD player), it is difficult or impossible to close the servo loop since the reproducing operation is started by use of this erroneously adjusted and stored gain value. In other wards, according to this technique, there is a problem that whether or not the gain value previously or presently obtained by the automatic gain controlling operation is valid can be recognized only by the abnormality in the reproducing operation of the optical disc player.

SUMMARY OF THE INVENTION

It is therefore an object of the present invention to provide an automatic gain control apparatus for an optical disc player, which can confirm the validity of the controlled or adjusted gain value obtained by the automatic gain controlling operation by use of a relatively simple construction, and can prevent the optical disc player from starting the reproducing operation by use of the erroneously controlled or adjusted gain value.

The above object of the present invention can be achieved by a first automatic gain control apparatus for an optical disc player, which is equipped or to be equipped in a servo loop to perform a servo control by use of an error signal in the optical disc player. The first apparatus is provided with: a gain control device for controlling a gain of the servo loop to have a controlled gain value corresponding to a signal level of the error signal in one series of automatic gain controlling operation; a memory for storing the controlled gain value as a previously controlled gain value in said one series of automatic gain controlling operation; a comparison device for comparing the previously controlled gain value, which is stored in the memory, with a presently controlled gain value of the gain of the servo loop, which is presently controlled by the gain control device in another series of automatic gain controlling operation after said one series of automatic gain controlling operation; and a controller for instructing the gain control device to control the gain of the servo loop again if a difference between the previously controlled gain value and the presently controlled gain value is not less than a predetermined value according to a comparison result of the comparison device in said another series of automatic gain controlling operation.

According to the first apparatus of the present invention, at first, in one series of automatic gain controlling operation, a gain of the servo loop is controlled to have a controlled gain value corresponding to a signal level of the error signal, by the gain control device. Then, this controlled gain value is stored as a previously controlled gain value into the memory. Later on, in another series of automatic gain controlling operation, the previously controlled gain value, which is stored in the memory, is compared with a presently controlled gain value of the gain of the servo loop, which is presently controlled by the gain control device, by the comparison device. Then, if a difference between the previously controlled gain value and the presently controlled gain value is not less than a predetermined value according to the comparison result, the gain of the servo loop is controlled again by the gain control device, as instructed by the controller. Thus, an erroneous control or adjustment of the gain in the automatic gain controlling operation, a failure or abnormality of the optical disc player, a setting-miss of the optical disc, a defect or abnormality of the optical disc and so on, can be found prior to the actual reproducing operation of the optical disc, and it is possible to efficiently prevent the occurrence of such a case that it is difficult or impossible to close the servo loop, according to the present invention.

In one aspect of the first apparatus of the present invention, the controller is provided with a device for instructing the gain control device to stop controlling the gain of the servo loop if the difference between the previously controlled gain value and the presently controlled gain value is not less than the predetermined value even after the gain control device has controlled the gain of the servo loop by predetermined times in said another series of automatic gain controlling operation. The first apparatus is further provided with a display device for displaying a message to inform that an operation is stopped.

According to this aspect, in said another series of automatic gain controlling operation, if the difference between the previously controlled gain value and the presently controlled gain value is not less than the predetermined value even after the gain control device has controlled the gain of the servo loop by predetermined times, the gain control device stops controlling the gain of the servo loop, as instructed by the controller. Then, a message to inform that an operation is stopped is displayed by the display device. Thus, it is possible to prevent the gain controlling operation from being performed again and again in a semi-persistent manner, and it is also possible for the user to easily recognize the failure or abnormality of the apparatus etc., according to the present invention.

In another aspect of the first apparatus of the present invention, the controller is provided with: a device for instructing the gain control device to stop controlling the gain of the servo loop if the difference between the previously controlled gain value and the presently controlled gain value is not less than the predetermined value even after the gain control device has controlled the gain of the servo loop by predetermined times in said another series of automatic gain controlling operation; a device for calculating an average of presently controlled gain values of the gain of the servo loop controlled by the predetermined times in said another series of automatic gain controlling operation; and a device for setting the calculated average as the presently controlled gain value to the gain control device and storing the calculated average to the memory in said another series of automatic gain controlling operation.

According to this aspect, in said another series of automatic gain controlling operation, if the difference between the previously controlled gain value and the presently controlled gain value is not less than the predetermined value even after the gain control device has controlled the gain of the servo loop by predetermined times, the gain control device stops controlling the gain of the servo loop, as instructed by the controller. Then, the average of presently controlled gain values of the gain of the servo loop controlled by the predetermined times in said another series of automatic gain controlling operation is calculated. Then, the calculated average is set as the presently controlled gain value to the gain control device, and is stored to the memory. Thus, it is possible to prevent the gain controlling operation from being performed again and again in a semi-persistent manner, and it is also possible to check whether or not the servo loop can be closed under the existence of some failure or abnormality by use of the average value.

In another aspect of the first apparatus of the present invention, the controller is provided with: a device for instructing the gain control device to stop controlling the gain of the servo loop if the difference between the previously controlled gain value and the presently controlled gain value is not less than the predetermined value even after the gain control device has controlled the gain of the servo loop by predetermined times in said another series of automatic gain controlling operation; and a device for setting the latest presently controlled gain value to the gain control device and storing the latest presently controlled gain value to the memory in said another series of automatic gain controlling operation.

According to this aspect, in said another series of automatic gain controlling operation, if the difference between the previously controlled gain value and the presently controlled gain value is not less than the predetermined value even after the gain control device has controlled the gain of the servo loop by predetermined times, the gain control device stops controlling the gain of the servo loop, as instructed by the controller. Then, the latest presently controlled gain value is set to the gain control device and is stored to the memory. Thus, it is possible to prevent the gain controlling operation from being performed again and again in a semi-persistent manner, and it is also possible to check whether or not the servo loop can be closed under the existence of some failure or abnormality by use of the latest presently controlled gain value.

In another aspect of the first apparatus of the present invention, the gain control device uses the previously controlled gain value, which is stored in the memory, as an initial value of the gain of the servo loop in said another series of automatic gain controlling operation.

According to this aspect, in said another series of automatic gain controlling operation, the previously controlled gain value, which is stored in the memory, is used by the gain control device, as an initial value of the gain of the servo loop, it is possible to smoothly start said another series of automatic gain controlling operation.

In another aspect of the first apparatus of the present invention, the error signal comprises a focusing error signal.

According to this aspect, the gain of the servo loop for the focusing error signal is controlled by the gain control device, and is compared by the comparison device. Thus, it is possible to perform a reliable automatic gain controlling operation for the focusing error signal, so that the focusing servo control during the reproduction of the optical disc can be reliably performed.

In another aspect of the first apparatus of the present invention, the error signal comprises a tracking error signal.

According to this aspect, the gain of the servo loop for the tracking error signal is controlled by the gain control device, and is compared by the comparison device. Thus, it is possible to perform a reliable automatic gain controlling operation for the tracking error signal, so that the tracking servo control during the reproduction of the optical disc can be reliably performed.

The above object of the present invention can be also achieved by a second automatic gain control apparatus for an optical disc player, which is equipped or to be equipped in servo loops to perform servo controls by use of at least two error signals in the optical disc player. The second apparatus is provided with: a gain control device for controlling gains of the servo loops to have controlled gain values corresponding to signal levels of the error signals respectively in one series of automatic gain controlling operation; a memory for storing the controlled gain values as previously controlled gain values respectively in said one series of automatic gain controlling operation; a comparison device for comparing a first difference between the previously controlled gain values, which are stored in the memory, with a second difference between presently controlled gain values of the gains of the servo loops, which are presently controlled by the gain control device in another series of automatic gain controlling operation after said one series of automatic gain controlling operation; and a controller for instructing the gain control device to control the gains of the servo loops again if a difference between the first difference and the second difference is not less than a predetermined value according to a comparison result of the comparison device in said another series of automatic gain controlling operation.

According to the second apparatus of the present invention, in one series of automatic gain controlling operation, the gains of the servo loops are controlled to have controlled gain values corresponding to signal levels of the error signals respectively, by the gain control device. Then, the controlled gain values are stored as previously controlled gain values respectively into the memory. Later on, in another series of automatic gain controlling operation, a first difference between the previously controlled gain values, which are stored in the memory, is compared with a second difference between presently controlled gain values of the gains of the servo loops, which are presently controlled by the gain control device, by the comparison device. Then, if a difference between the first difference and the second difference is not less than a predetermined value according to the comparison result, the gains of the servo loops are controlled again by the gain control device, as instructed by the controller. Thus, an erroneous control or adjustment of the gain in the automatic gain controlling operation, and so on, can be found prior to the actual reproducing operation of the optical disc, and it is possible to efficiently prevent the occurrence of such a case that it is difficult or impossible to close the servo loop. Especially, the second apparatus is advantageous in that the validity of the two gains for the two error signals can be simultaneously confirmed by just one comparison.

In one aspect of the second apparatus of the present invention, the error signals comprise a focusing error signal and a tracking error signal.

According to this aspect, the gains of the servo loops for the focusing and tracking error signals are controlled by the gain control device, and the difference between them is compared by the comparison device. Thus, it is possible to perform a reliable automatic gain controlling operation for both of the focusing and tracking error signals by just one comparison, so that the focusing and tracking servo controls during the reproduction of the optical disc can be reliably performed.

The above object of the present invention can be also achieved by a third automatic gain control apparatus for an optical disc player, which is equipped or to be equipped in servo loops to perform servo controls by use of at least two error signals in the optical disc player. The third apparatus is provided with: a gain control device for controlling gains of the servo loops to have controlled gain values corresponding to signal levels of the error signals respectively in one series of automatic gain controlling operation; a comparison device for comparing the controlled gain values with each other in said one series of automatic gain controlling operation; and a controller for instructing the gain control device to control the gains of the servo loops again if a difference between the controlled gain values is not less than a predetermined value according to a comparison result of the comparison device in said one series of automatic gain controlling operation.

According to the third apparatus of the present invention, in one series of automatic gain controlling operation, the gains of the servo loops are controlled to have controlled gain values corresponding to signal levels of the error signals respectively by the gain control device. Then, the controlled gain values are compared with each other by the comparison device. Then, if a difference between the controlled gain values is not less than a predetermined value according to the comparison result, the gains of the servo loops are controlled again by the gain control device, as instructed by the controller. Thus, an erroneous control or adjustment of the gain in the automatic gain controlling operation, and so on, can be found prior to the actual reproducing operation of the optical disc, and it is possible to efficiently prevent the occurrence of such a case that it is difficult or impossible to close the servo loop. Especially, the third apparatus is advantageous in that the validity of the two gains for the two error signals can be simultaneously confirmed by just one comparison, and that it is not necessary to read out the previous gain values in order to perform the comparison.

In one aspect of the third apparatus of the present invention, the error signals comprise a focusing error signal and a tracking error signal.

According to this aspect, the gains of the servo loops for the focusing and tracking error signals are controlled by the gain control device, and the difference between them is compared by the comparison device. Thus, it is possible to perform a reliable automatic gain controlling operation for both of the focusing and tracking error signals by just one comparison, so that the focusing and tracking servo controls during the reproduction of the optical disc can be reliably performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

First Embodiment

A first embodiment of the present invention is an automatic gain control apparatus, which is equipped in a CD player and performs the automatic gain controlling operation when an audio level detected by a signal process circuit becomes equal to or higher than a predetermined level.

At first, a construction of the first embodiment will be explained with reference to FIGS. 1 and 2.

Figure 1:
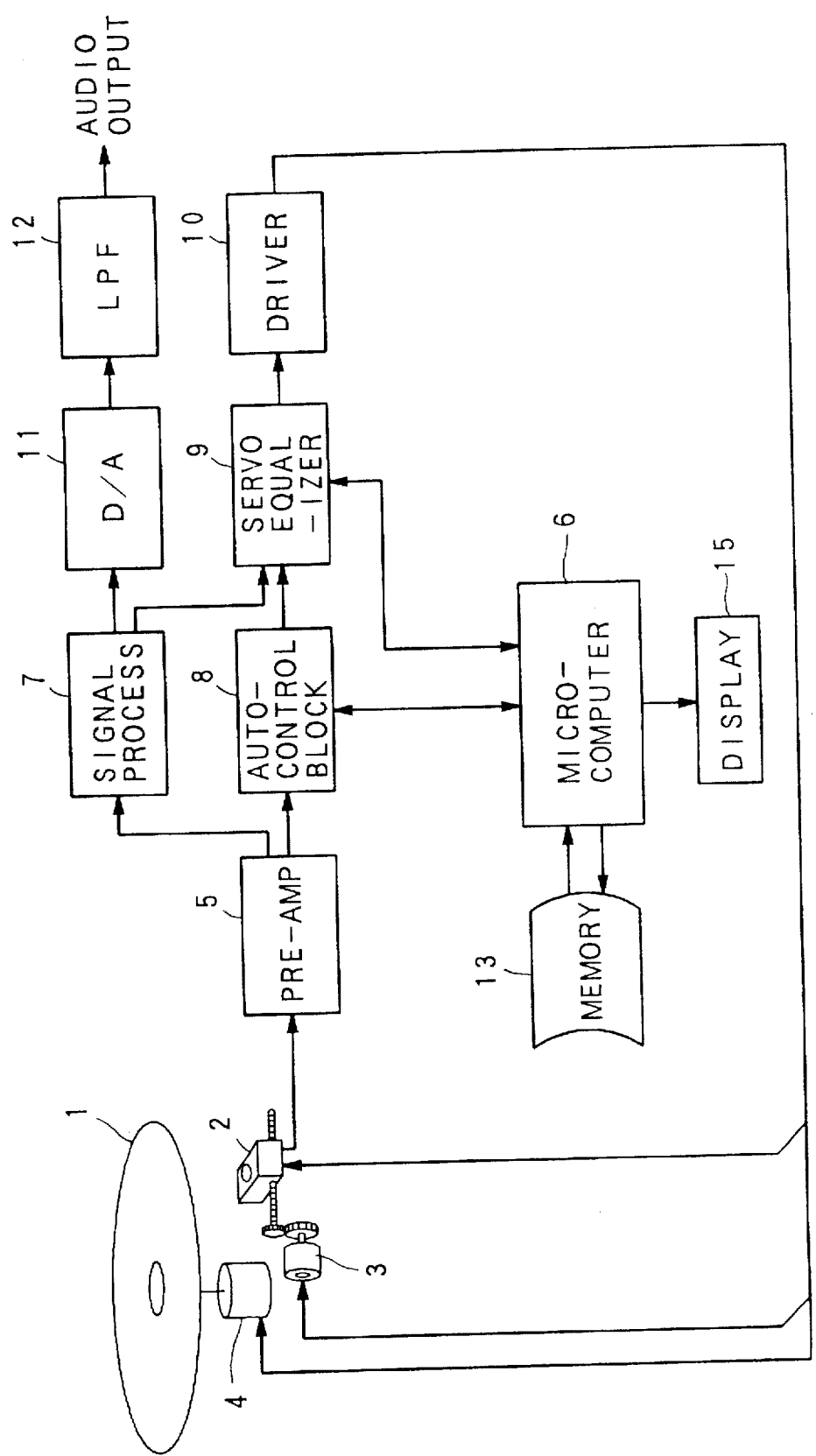
FIG. 1 is a block diagram of a CD player according to a first embodiment of the present invention.

FIG. 1 shows a construction of a CD player as for its elements related to a servo control system.

In FIG. 1, the CD player is provided, as for an audio signal decoding stream, with: an optical pickup 2 for reading out a signal through a lens (not shown) from an information record track of an optical disc 1 as one example of an optical record medium, on which the signal is recorded; a carriage motor 3 for driving the optical pickup 2 in a radial direction of the optical disc 1; a spindle motor 4 for rotating the optical disc 1; a pre-amplifier 5 for amplifying the read out signal from the optical pickup 2 and outputting a binary RF (Radio Frequency) signal and further outputting a focusing error signal and a tracking error signal; a signal processing circuit 7 for generating a signal for velocity control of the spindle motor 4 (i.e. a CLV (Constant Linear Velocity) signal) out of the binary RF signal, and applying to it an EFM (Eight to Fourteen Modulation) operation, an error correction decoding operation by means of CIRC (Cross Interleave Read Solomon Code) etc. to output a digital signal of 16 bits to a D/A (Digital to Analog) converter 11; the D/A converter 11 for converting the digital signal of 16 bits to an analog signal; and a low pass filter (LPF) 12 for passing therethrough the audible frequency band of the analog signal and removing noise components to output an audio signal.

The CD player is provided, as for a signal stream of the servo system, with: an automatic gain control block 8 for controlling (adjusting) gains of various error signals supplied from the pre-amplifier 5 to respectively output the error signals having predetermined levels for the servo system; a servo equalizer 9 for adjusting the frequency for the servo control operation; a driver 10 for respectively driving focusing/tracking coils (not shown) of the optical pickup 2 and the carriage motor 3 and the spindle motor 4 by amplifying electric currents of the generated driving signals; a microcomputer (micon) 6 for controlling a system as a whole; and a memory 13 for storing controlled (adjusted) gain values obtained in the past automatic gain controlling operation.

The lens in the optical pickup 2 is driven by the tracking coil (not shown) in the radial direction of the optical disc 1 and driven by the focusing coil (not shown) in the focusing direction, so that the light receiving portion of the optical pickup 2 be appropriately positioned with respect to the reflected light from the information record track of the optical disc 1 by the servo system.

The memory 13 preferably comprises a non-volatile type memory such as an SRAM (Static Random Access Memory) backed-up by a super capacitor or a battery. The memory 13 is constructed to store a controlled (adjusted) focusing servo gain value F0 and a controlled (adjusted) tracking servo gain value T0 as the appropriately controlled and adopted gain values to predetermined memory areas respectively.

In FIG. 1, the CD player is also provided with a display device 15, which is connected to the microcomputer 6 and has an LCD (Liquid Crystal Display) panel for example, for displaying various information related to the reproduction of the optical disc 1.

In the present embodiment, the automatic gain control block 8, the microcomputer 6 and the memory 13 constitute one example of the automatic gain controlling apparatus of the present invention.

Figure 2:
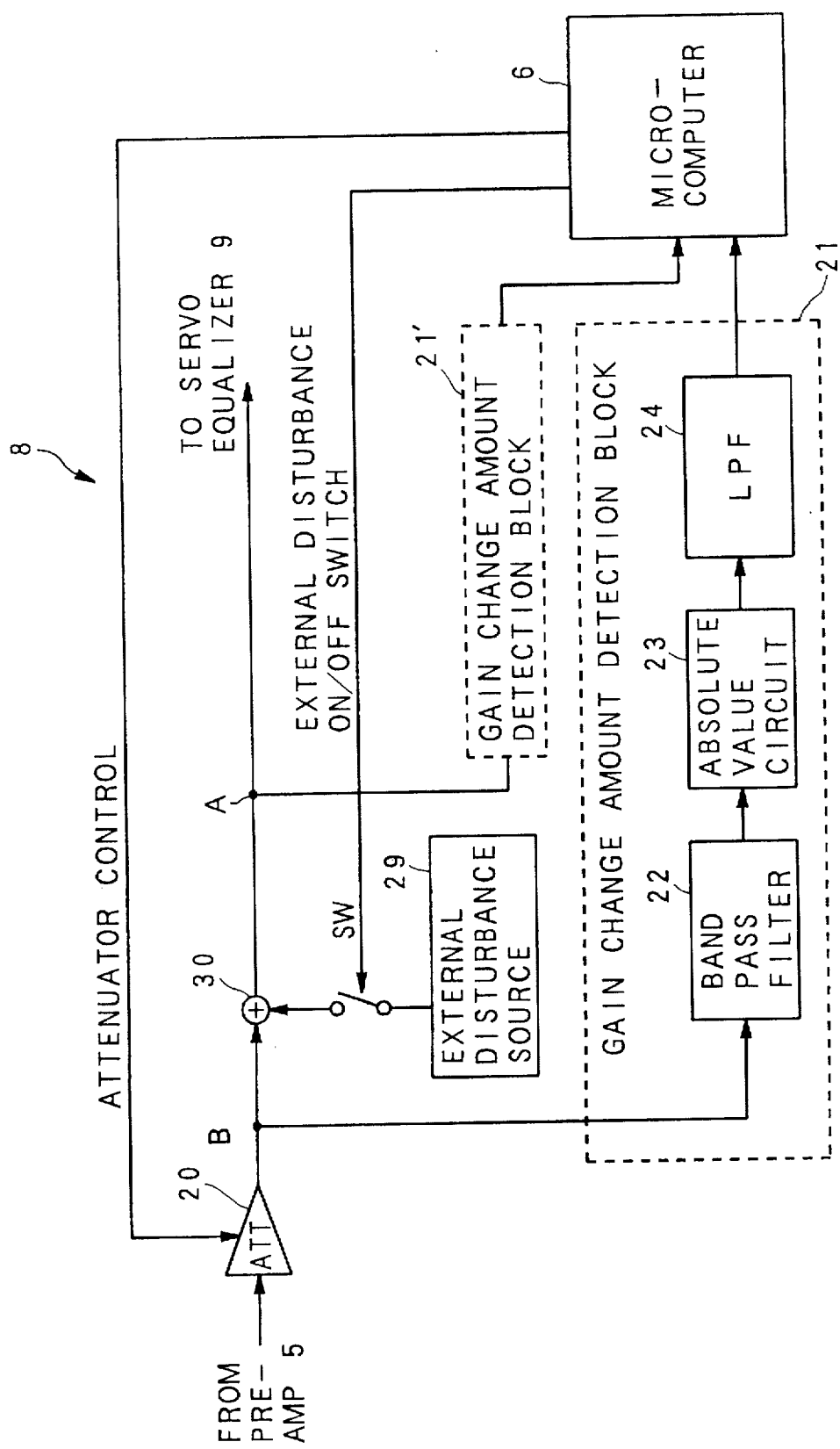
FIG. 2 is a block diagram of an automatic gain control block in the first embodiment.

FIG. 2 shows a detailed construction of the automatic gain control block 8 of FIG. 1.

In FIG. 2, the automatic gain control block 8 is provided with: an attenuator (ATT) 20 for controlling or adjusting the gains of various error signals supplied from the pre-amplifier 5 i.e., changing the gains of the error signals according to an attenuator control signal supplied from the microcomputer 6, so that the error signals have levels optimum for inputting them into the servo equalizer 9, and outputting the resultant error signals; a gain change amount detection block 21 connected to a first branch point (i.e. a B branch point) for detecting a gain change amount of the error signal including an external disturbance which has traveled one round through the servo loop; an adder 30 for adding the external disturbance from an external disturbance source 29 onto the error signal from the B branch point; and a gain change amount detection block 21' connected to an output point of the adder 30 (i.e. an A branch point) for detecting a gain change amount immediately after the addition of the external disturbance.

The purpose of the external disturbance source 29 is to add, onto the error signal, external disturbance signals which values are pseudo-determined (e.g. signals having constant frequency components and constant amplitudes generated by an oscillator etc.) and to check the level of the error signal which changes by the addition of the external disturbance signals. The external disturbance signals are selectively supplied to the adder 30 via the switch SW, which is turned ON/OFF (closed/opened) under the control of the microcomputer 6.

Each of the gain change amount detection blocks 21 and 21' is provided with: a band pass filter 22 for passing therethrough the frequency band of the external disturbance signal; an absolute value circuit 23 for converting the input signal to an absolute value signal; and a low pass filter (LPF) 24 for removing the frequency component of the external disturbance signal and rectifying it.

Nextly, the operation of the first embodiment will be explained with referring to a flow chart of FIG. 3.

Figure 3:
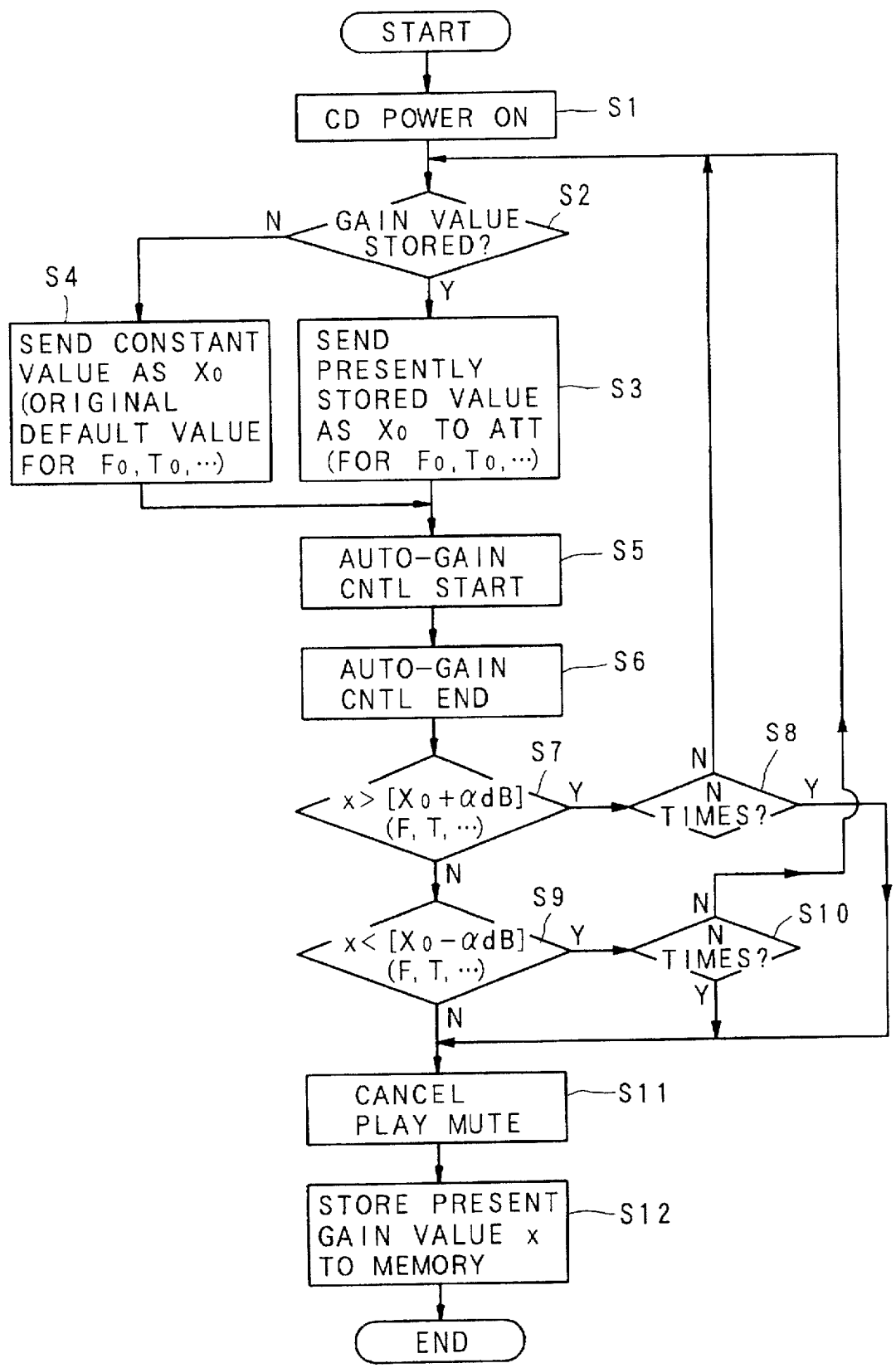
FIG. 3 is a flow chart showing an operation of the first embodiment.

In FIG. 3, at first, when the main power is turned on and the CD is set (step S1), the microcomputer 6 judges whether or not the previously adopted gain value, which has been controlled (adjusted) and finally adopted in the previous automatic gain controlling operation, is stored in the memory 13 by checking the predetermined address of the memory 13 (step S2). The memory 13 is constituted from the SRAM etc., which is backed-up by a super capacitor or a battery. Thus, as long as the adopted gain value is stored in the previous reproducing operation, even if the main power is turned off, the gain value in the memory 13 can be maintained and can be used for the next (present) reproducing operation.

At the step S2, if it is judged that the gain value is stored (step S2: YES), the previously adopted gain value $X_0$ (=$F_0$ (previously adopted gain value for focusing servo), $T_0$ (previously adopted gain value for tracking servo), . . . respectively) stored in the predetermined address in the memory 13 is sent to the attenuator 20 as an initial value for the present automatic gain controlling operation (step S3).

On the other hand, if it is not judged that the gain value is stored (step S2: NO) since the corresponding memory content is indefinite or uncertain, it is concluded that this is the case where the memory is newly used (firstly used after the memory content has been cleared) or where the memory content of the memory 13 is destroyed due to noises or other causes. Thus, a constant gain value is sent as the initial value for the present automatic gain controlling operation to the attenuator 20 in place of the stored gain value $X_0$ (=$F_0$, $T_0$, etc.) (step S4). As described above, the initial value setting operation for the automatic gain controlling operation is completed from the steps S1 to S4.

Nextly, the automatic gain controlling operation (AUTO-GAIN CNTL) is started, which will be explained later in detail with reference to FIG. 4 (step S5). In the automatic gain controlling operation, a fine adjustment of the gain value set in the attenuator 20 is performed by injecting the external disturbance, and the newest gain value is reflected to the attenuator 20.

When the automatic gain controlling operation is completed (step S6), the presently controlled (adjusted) gain value x obtained by the present automatic gain controlling operation and the previously adopted gain value $X_0$ stored in the memory 13 are compared with each other (for F (gain value for focusing servo), T (gain value for tracking servo), . . . respectively). Namely, at first, it is judged whether or not the expression "$x>[X_0+\alpha[dB]]$" is affirmed for F, T, . . . , respectively (step S7). Here, if it is affirmed (step S7: YES), since the presently obtained gain value is significantly different from the previously adopted gain value stored in the memory, the flow branches to a step S8, where it is judged whether or not the automatic gain controlling operation (the steps S5 and S6) has been performed N times (step S8). Here, the number N indicates the number of times predetermined as a specification of the apparatus (i.e. the CD player). For example, an arbitrary natural number can be set as 3 times, 5 times, 10 times and so on, and is actually set in accordance with the processing capability of the microcomputer 6, and the magnitudes of various parameters prescribing the automatic gain controlling operation. This judgment is, for example, performed by a counter for counting the number of times of the comparing and judging operation. At the step S8, if it is not judged to be performed N times (step S8: NO), the flow returns to the step S2, and the automatic gain controlling operation is repeatedly performed. On the other hand, if it is judged to be performed N times (step S8: YES), the presently controlled gain value, which is obtained by the automatic gain controlling operation (the steps S5 and S6) performed at the latest (i.e. after N times of the controlling operation), or the average value of the gain values of N times of the controlling operation, is adopted as the effective gain value to be actually used for starting the reproducing operation, and the flow branches to the step S11. In this manner, at the step S8 and a step S10 explained later, the automatic gain controlling operation (the steps S5 and S6) is stopped when the gain value estimated as an appropriate value cannot be obtained after N times of the automatic gain controlling operation. Thus, even if there is a failure or abnormality in the apparatus, or even if there is an abnormality in the previously adopted gain value stored in the memory 13 or in the default gain value, it is possible to prevent the automatic gain controlling operation from being repeated in a semi-persistent manner.

At the step S7, if the expression "$x>[X_0+\alpha[dB]]$" is not judged to be affirmed (step S7: NO), the flow branches to the step S9, where it is further judged whether or not the expression "$x<[X_0-\alpha[dB]]$" is affirmed for F, T, . . . (step S9). Here, if it is affirmed (step S9: YES), since the presently obtained gain value is significantly different from the previously adopted gain value stored in the memory, the flow branches to a step S10, where it is judged whether or not the automatic gain controlling operation (the steps S5 and S6) has been performed N times (step S10). Here, the number N indicates the number of times predetermined as a specification of the apparatus in the same manner as the case of step S8. This judgment is, for example, performed by a counter for counting the number of times of the comparing and judging operation. At the step S10, if it is not judged to be performed N times (step S10: NO), the flow returns to the step S2, and the automatic gain controlling operation is repeatedly performed. On the other hand, if it is judged to be performed N times (step S10: YES), the presently controlled gain value, which is obtained by the automatic gain controlling operation (the steps S5 and S6) performed at the latest (i.e. after N times of the controlling operation), or the average value of the gain values of N times of the controlling operation, is adopted as the effective gain value to be actually used for starting the reproducing operation, and the flow branches to the step S11.

On the other hand, at the step S9, if it is not judged that the expression "$x<[X_0-\alpha[dB]]$" is affirmed (step S9: NO), since the presently obtained gain value is sufficiently close to the previously adopted gain value stored in the memory, the present gain value is adopted as the gain value actually used when the reproducing operation is started, and the flow proceeds to the step S11.

As the value $\alpha$, any value in a range from about 6 to 12 [dB] can be adopted, which is determined in accordance with the specification of the apparatus. Especially, if the value of $\alpha$ is set too small, since there is a variation in the automatic gain controlling operation, the controlling operation will be repeatedly performed while the judgments at the steps S7 and S9 are difficult to pass. Consequently, it takes relatively long time period until starting the reproducing operation. On the other hand, if the value of $\alpha$ is set too large e.g. exceeding the controllable range where the automatic gain controlling operation is effective, the automatic gain controlling operation does not work literally.

At the step S11, a mute signal to mute the play i.e., to stop the reverse-quantized output to the audio signal system, is canceled, and the reproduction of the music is started. Then, the presently controlled gain value x (for F, T, . . . . respectively) confirmed at the steps S7 and S9 is stored at a certain timing to a predetermined address of the memory 13, where the gain value $X_0$ for the next automatic gain controlling operation, and the operation is ended (step S12).

Nextly, the operation sequence at the steps S5 and S6 in the above explanation will be explained in more detail with referring to a flow chart of FIG. 4.

Figure 4:
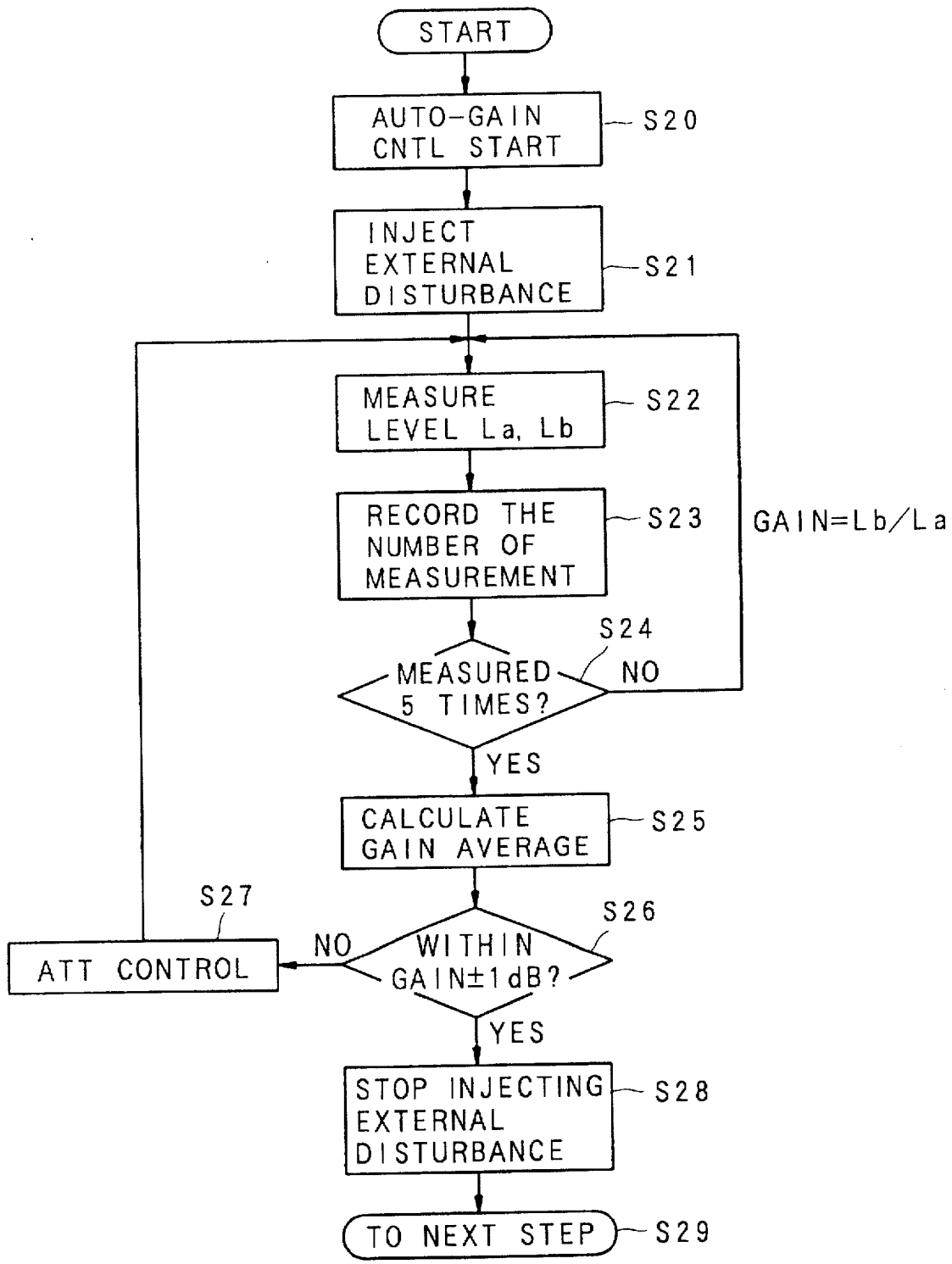
FIG. 4 is a flow chart showing an automatic gain controlling operation of the first embodiment.

In FIG. 4, when the automatic gain controlling operation is started (step S20), at first, the microcomputer 6 closes the switch SW shown in FIG. 2 so as to inject the external disturbance signal generated by the external disturbance source 29 to the adder 30 (step S21). Then, the error signal added with this external disturbance signal is inputted through the A branch point in FIG. 2, to the gain change amount detection block 21', and the signal level La is measured by the microcomputer 6 (step S22). At the same time, the signal added with the external disturbance signal is supplied through the A branch point to the servo equalizer 9 shown in FIG. 1, and is applied to the optical pickup 2 by the driver 10. Then, corresponding to the external disturbance, the lens of the optical pickup 2 is driven to be slightly moved. Since the error signal level is changed non-linearly depending upon the offset of the optical pickup 2 from the lens center, the error signal is changed in correspondence with this slight movement and is inputted to the automatic gain control block 8 again through the pre-amplifier 5.

Here, the controlled or adjusted gain value of the attenuator 20 is equal to the value set by the attenuator control signal supplied from the microcomputer 6 at the step S6, and corresponds to the previous gain value $X_0$ (=$F_0$, $T_0$, . . . ) read out of the memory 13.

Then, the signal level Lb of the signal inputted to the B branch point through the servo loop is checked by the gain change amount detection block 21 (step S22). The external disturbance source 29 oscillates at the constant amplitude and at the constant frequency. Thus, since the band pass filter 22 only passes the inputted signal having the oscillation frequency of the external disturbance source 29, even if other external disturbances are included in the various error signals, only the frequency of the external disturbance source 29 can be inputted to and detected by the gain change amount detection block 21. Here, the gain of the servo loop is obtained by a following expression.

$$GAIN = Lb/La$$

wherein:

La is an input level from the A branch point to the microcomputer 6; and

Lb is an input level from the B branch point to the microcomputer 6.

Those measurement results of the levels La and Lb are stored into the memory 13.

Nextly, in order to perform the level measurement at the step S22 by a plurality of times (i.e. 5 times in the present embodiment) and obtain the average value of the calculated gains, the number of the level measurement is recorded (step S23). The counter for this purpose is set to zero as the initial value, and the operation thereof is to simply increment the counter value one by one (the counter value becomes +1 of the previous value). Then, it is judged whether or not the measurement number recorded at the step S23 is coincident with a predetermined number i.e. "5" (step S24). If the measurement number is less than the predetermined number "5" (step S24: NO), the gain is calculated as GAIN=Lb/La, and the flow returns to the step S22, where the measurement is performed again. If the measurement number reaches the predetermined number "5" (step S24: YES), the calculation for the average gain values is performed by reading the past measurement values from the memory 13 (step S25).

Now, since the condition for the stable servo control is experimentally known as "a changing range of the input gain within 1 dB" for example, it is judged whether or not the changing range of the obtained gain i.e. the above calculated average value is within ±1 dB (step S26). If it is not within ±1 dB (step S26: NO), the gain of the attenuator 20 is re-controlled or re-adjusted in a direction to make it within ±1 dB (i.e. the direction to decrease the gain) (step S27), and the flow returns to the step S22 so that the above steps until the step S26 are repeatedly performed.

On the other hand, if the change range of the gain is within ±1 dB (step S26: YES), since it satisfies the condition of the stable servo control, the switch SW shown in FIG. 2 is opened, so that the injection of the external disturbance signal is stopped (step S28). Then, the operation proceeds to the next step (step S29). Namely, the automatic gain controlling operation in FIG. 3 is ended (step S6).

As described above in detail, according to the first embodiment, since the previously adopted gain value $X_0$ read out of the non-volatile type memory and the presently controlled gain value x are compared with each other for F, T, . . . respectively, it is possible to confirm whether the presently controlled gain value x is erroneous or correct. Namely, if the gain value is obtained by the present automatic gain controlling operation which is extraordinary different from the previously adopted gain value stored in the memory 13, it is possible to judge that the presently controlled gain value is erroneous. Especially, if it is judged to be erroneous, since the gain value able to be judged as a correct value can be obtained by repeatedly performing the automatic gain controlling operation, the servo loop can be more reliably closed. And that, if the gain value x able to be judged as the correct value cannot be obtained after performing the automatic gain controlling operation by a pre-determined times, the automatic gain controlling operation is stopped. At this time, the gain value obtained by the automatic gain controlling operation performed at the final (at the $N^{th}$ time) or the average value of the gain values obtained by the automatic gain controlling operations of N times, is adopted as the gain value used for starting the reproducing operation, so that it is possible to prevent the automatic gain controlling operation from being repeatedly performed in a semi-persistent manner even if there is a failure or abnormality in the apparatus. Furthermore, even if the previously adopted gain value is lost (indefinite or uncertain) by some reason in the memory, the default value can be still called for and can be used as the initial value for the automatic gain controlling operation. Namely, the default value can be compared with the presently controlled gain value in place of the previously adopted gain value stored in the memory 13, so that it is possible to prevent the case where the automatic gain controlling operation cannot be performed, regardless of the recording condition of the memory 13.

Although, after the automatic gain controlling operation is ended (i.e. after the step S6 in FIG. 3), the comparison of the gain values (steps S7 and S9) is performed in the present embodiment, the comparison as in the steps S7 and S9 in FIG. 3 may be performed immediately after the calculations of the gain (=La/Lb) and the average at the step S25 in FIG. 4, and then the automatic gain controlling operation may be performed again.

Second Embodiment

A second embodiment of the present invention is constructed such that, when the gain value able to be judged as a correct value cannot be obtained after performing the automatic gain controlling operation by a predetermined times, it stops the reproducing operation of the CD, and performs an error display.

The hardware construction of the CD player for the second embodiment is the same as the first embodiment shown in FIGS. 1 and 2, and the explanations thereof are omitted here.

Figure 5:
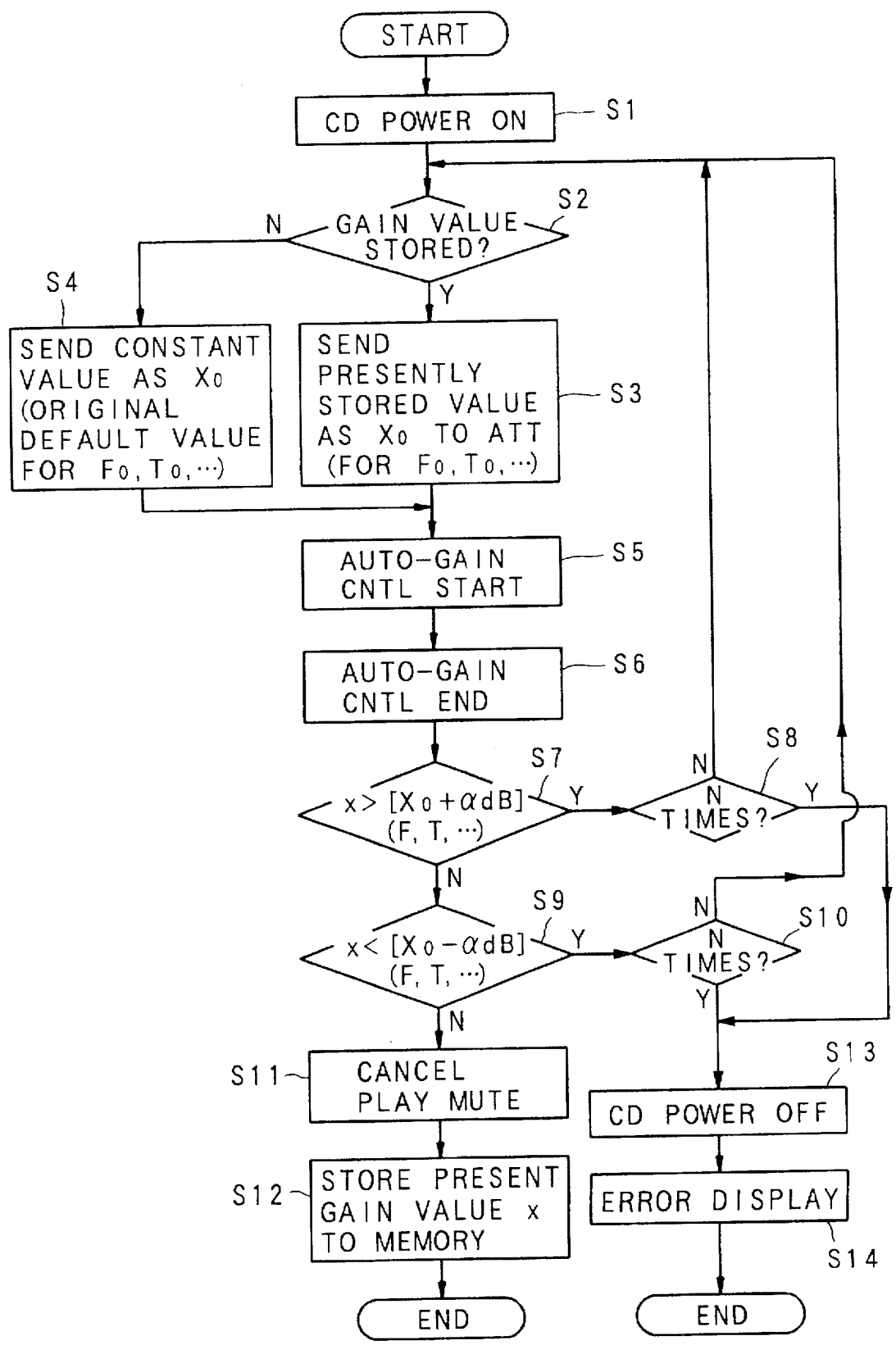
FIG. 5 is a flow chart showing an operation of a second embodiment of the present invention.

The operation of the second embodiment will be explained hereinbelow with referring to a flow chart of FIG. 5. In FIG. 5, the same steps as those in FIG. 3 carry the same step numbers and the explanations thereof are omitted.

In FIG. 5, the steps S1 to S12 are the same as the first embodiment of FIG. 3, except that, at the steps S8 and S10, if the automatic gain controlling operation is performed N times (steps S8: YES, step S10: YES), the flow branches to a step S13.

At the step S13, the reproducing operation of the CD is stopped since it is estimated that there is a failure or abnormality in the CD player. More concretely, the power for the CD reproduction is turned off, so that the rotation of the CD may be stopped, the CD may be ejected from the CD player and so on. Then, an error display is performed by displaying a predetermined error message etc., on a front panel of the CD player, i.e. the display device 15 in FIG. 1 (step S14), and the reproduction of the CD is ended (abnormal end).

As described above, according to the second embodiment, in case that the gain value able to be judged as a correct value cannot be obtained after performing the automatic gain controlling operation by N times, it stops the automatic gain controlling operation, and performs the error display. Thus, even if there is a failure or abnormality in the apparatus, or even if the default gain value or the previously adopted gain value stored in the memory 13 is abnormal for some reason, it is possible to efficiently prevent the automatic gain controlling operation from being performed in a semi-persistent manner, and it is also possible to efficiently prevent the reproducing operation from being started by use of the erroneous gain value.

Third Embodiment

A third embodiment of the present invention is constructed such that the gain values $F_0$ and F for focusing servo are not compared with each other, or the gain values $T_0$ and T for tracking servo are not compared with each other as in the first or second embodiment. Instead, the third embodiment is constructed such that the previous difference value $X_0=|F_0-T_0|$ between the previously adopted gain value $F_0$ for focusing servo and the previously adopted gain value $T_0$ for tracking servo is compared with the present difference value $x=|F-T|$ between the presently controlled gain value F for focusing servo and the presently controlled gain value T for tracking servo, so that it can judge whether or not the presently controlled gain values F and T are correct on the basis of the difference between the difference values $X_0$ and x. Namely, if the difference between the difference values $X_0$ and x is extraordinary large, it is estimated that there is a high possibility of erroneous control or adjustment for at least one of the gain values F or T, so that the control or adjustment for the gain value will be performed again.

The third embodiment is based on a following theory. Namely, assuming that just one of the focusing and the tracking is correctly gain-controlled and the other is erroneously gain-controlled, as for the correctly gain-controlled one of them, the previously adopted gain value and the presently controlled gain value are supposed to have values relatively similar to each other. On the other hand, as for the erroneously gain-controlled one of them, the previously adopted gain value and the presently controlled gain value are supposed to have values relatively different from each other. Thus, in the difference between the previous and present difference values $X_0$ and x, the erroneously controlled one of them becomes dominant component. Further, even if both of them (i.e. as for F and T) are erroneously gain-controlled, since there is no special correlation between these gain values in general, there is little or practically no possibility that these gain values are canceled by each other in the difference value x so that the present difference value x be coincident with the previous difference value $X_0$ by chance. As a result, by comparing these previous and present difference values $X_0$ and x with each other, it is possible to judgment the validity of the controlling or adjusting operation of the focusing servo and the tracking servo at the same time by just one comparison.

The hardware construction of the CD player for the third embodiment is the same as the first embodiment shown in FIGS. 1 and 2, and the explanations thereof are omitted here.

The operation of the third embodiment will be explained hereinbelow with referring to a flow chart of FIG. 6.

Figure 6:
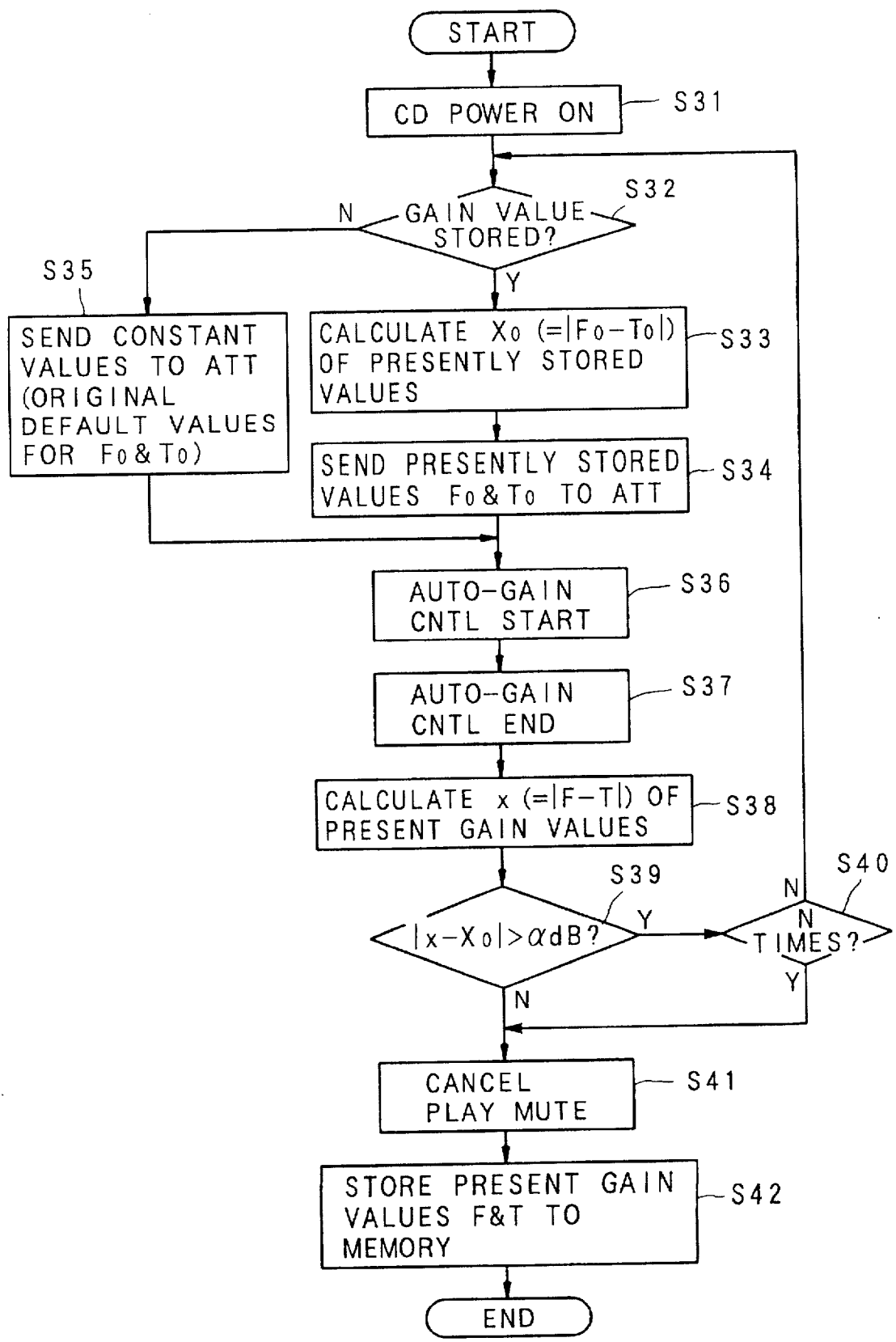
FIG. 6 is a flow chart showing an operation of a third embodiment of the present invention.

In FIG. 6, at first, when the main power is turned on and the CD is set (step S31), the microcomputer 6 judges whether or not the previously adopted gain values $F_0$ and $T_0$, which have been obtained in the previous automatic gain controlling operation, are stored in the memory 13 by checking the predetermined addresses of the memory 13 (step S32).

At the step S32, if it is judged that the gain values $F_0$ and $T_0$ are stored (step S32: YES), the previous difference value $X_0=|F_0-T_0|$ between the previously adopted gain value $F_0$ for focusing servo and the previously adopted gain value $T_0$ for tracking servo, both of which are presently stored in the memory 13, is calculated (step S33). Then, the previously adopted gain values $F_0$ and $T_0$ are sent to the attenuator 20 as the initial values for the automatic gain controlling operations for focusing and tracking servos respectively (step S34).

On the other hand, if it is not judged that the gain values $F_0$ and $T_0$ are stored (step S32: NO) since the corresponding memory contents are indefinite or uncertain, constant gain values (original default values for $F_0$ and $T_0$) are sent as the initial values for the automatic gain controlling operations to the attenuator 20 in place of the stored gain values $F_0$ and $T_0$ (step S35). As described above, the initial value setting operation for the automatic gain controlling operation and the calculating operation of the previous difference value $X_0$ used for the judgment afterward are completed from the steps S31 to S35.

Nextly, the automatic gain controlling operation is started, which has been already explained in detail with reference to FIG. 4 (step S36). In the automatic gain controlling operation, a fine adjustment of the gain value set in the attenuator 20 is performed by injecting the external disturbance, and the newest gain value is reflected to the attenuator 20.

When the automatic gain controlling operation is completed (step S37), the present difference value x (=|F-T|) between the presently controlled gain value F for focusing servo and the presently controlled gain value T for tracking servo obtained by the present automatic gain controlling operation is calculated (step S38). Then, this calculated present difference value x and the previous difference value $X_0$, which has been calculated at the step S33, are compared with each other. Namely, it is judged whether or not the expression "$|x-X_0|>\alpha[dB]$" is affirmed (step S39). Here, if it is affirmed (step S39: YES), since at least one of the presently obtained gain values are significantly different from the corresponding one of the previously adopted gain values stored in the memory 13, the flow branches to a step S40, where it is judged whether or not the automatic gain controlling operation (the steps S36 and S37) has been performed N times (step S40). This judgment is, for example, performed by a counter for counting the number of times of the comparing and judging operation. At the step S40, if it is not judged to be performed N times (step S40: NO), the flow returns to the step S32, and the automatic gain controlling operation is repeatedly performed. On the other hand, if it is judged to be performed N times (step S40: YES), the presently controlled gain values F and T, which are obtained by the automatic gain controlling operation (at the steps S36 and S37) performed at the latest (i.e. after N times of the controlling operation), or the average value of the gain values F and the average value of the gain values T of N times of the controlling operation, are respectively adopted as the effective gain values to be actually used for starting the reproducing operation, and the flow branches to the step S41.

At the step S39, if the expression "$|x-X_0|>\alpha[dB]$" is not judged to be affirmed (step S39: NO), the flow branches to the step S41, since both of the presently obtained gain values F and T are supposed to be similar to the previously adopted gain values $F_0$ and $T_0$ stored in the memory respectively.

At the step S41, a mute signal to mute the play i.e., to stop the reverse-quantized output to the audio signal system, is canceled, and the reproduction of the music is started. Then, the presently controlled gain values F and T confirmed at the steps S36 to S39 are stored to predetermined addresses of the memory 13 respectively, as the gain values $F_0$ and $T_0$ usable for the next automatic gain controlling operation, and the operation is ended (step S42).

It is possible to construct the third embodiment such that, when the automatic gain control operation is performed N times at the step S40 (step S40: YES), the reproducing operation of the CD is stopped and the error display is performed since there is an abnormality or failure in the CD player (abnormal end), in the same manner as the second embodiment.

As described above in detail, according to the third embodiment, it is possible to check whether at least one of the presently controlled gain values F and T is erroneous or both are correct, by comparing the previous difference value $X_0$, which is obtained from the previously adopted gain values $F_0$ and $T_0$ stored in the non-volatile memory 13, and the present difference value x, which is obtained from the presently controlled gain values F and T. Namely, by performing just one comparison between the previous and present difference values $X_0$ and x, the judgments for both of the focusing and tracking servos can be performed at once. Accordingly, the third embodiment is quite advantageous in simplifying the calculation process.

In the third embodiment, although the difference value (|F-T|) is set as the object for the comparison, the sum value (|F+T|) may be set as the object for the comparison, since one of the gain values F and T which is erroneously controlled is also dominant in the sum vale.

Fourth Embodiment

A fourth embodiment of the present invention is constructed such that the previously adopted gain value or the previous difference value is not compared with the presently controlled gain value or the previous difference value as in the first to third embodiments. Instead, the fourth embodiment is constructed to judge the validity of the presently controlled gain values F and T by comparing these presently controlled gain values F and T with each other.

The fourth embodiment is based on a following theory. Namely, assuming that just one of the focusing and the tracking is correctly gain-controlled and the other is erroneously gain-controlled, as for the correctly gain-controlled one of them, the presently controlled gain value and a predetermined gain value, which is set in advance as a value to be obtained by a correct gain-controlling operation, are supposed to have values relatively similar to each other. On the other hand, as for the erroneously gain-controlled one of them, the presently controlled gain value and a predetermined gain value, which is set in advance as a value to be obtained by a correct gain-controlling operation, are supposed to have values relatively different from each other. Thus, when the present difference value x (=|F-T|) between the presently controlled gain values F and T, and a predetermined difference value between the predetermined gain values, which are set in advance, are compared with each other, the erroneously gain-controlled one of them becomes dominant component in this difference. Further, even if both of them (i.e. as for F and T) are erroneously gain-controlled, since there is no special correlation between these gain values in general, there is little or practically no possibility that these gain values are canceled in this difference by each other so that the present difference value x be coincident with the predetermined difference value by chance. As a result, by comparing the present difference value x with the predetermined value, it is possible to judgment the validity of the gain controlling or adjusting operation of the focusing servo and the tracking servo at the same time by just one comparison. Further, the fourth embodiment is advantageous in that it is not necessary to read out the previously adopted gain values from the memory to compare them with the presently controlled gain values.

The hardware construction of the CD player for the fourth embodiment is the same as the first embodiment shown in FIGS. 1 and 2, and the explanations thereof are omitted here.

Figure 7:
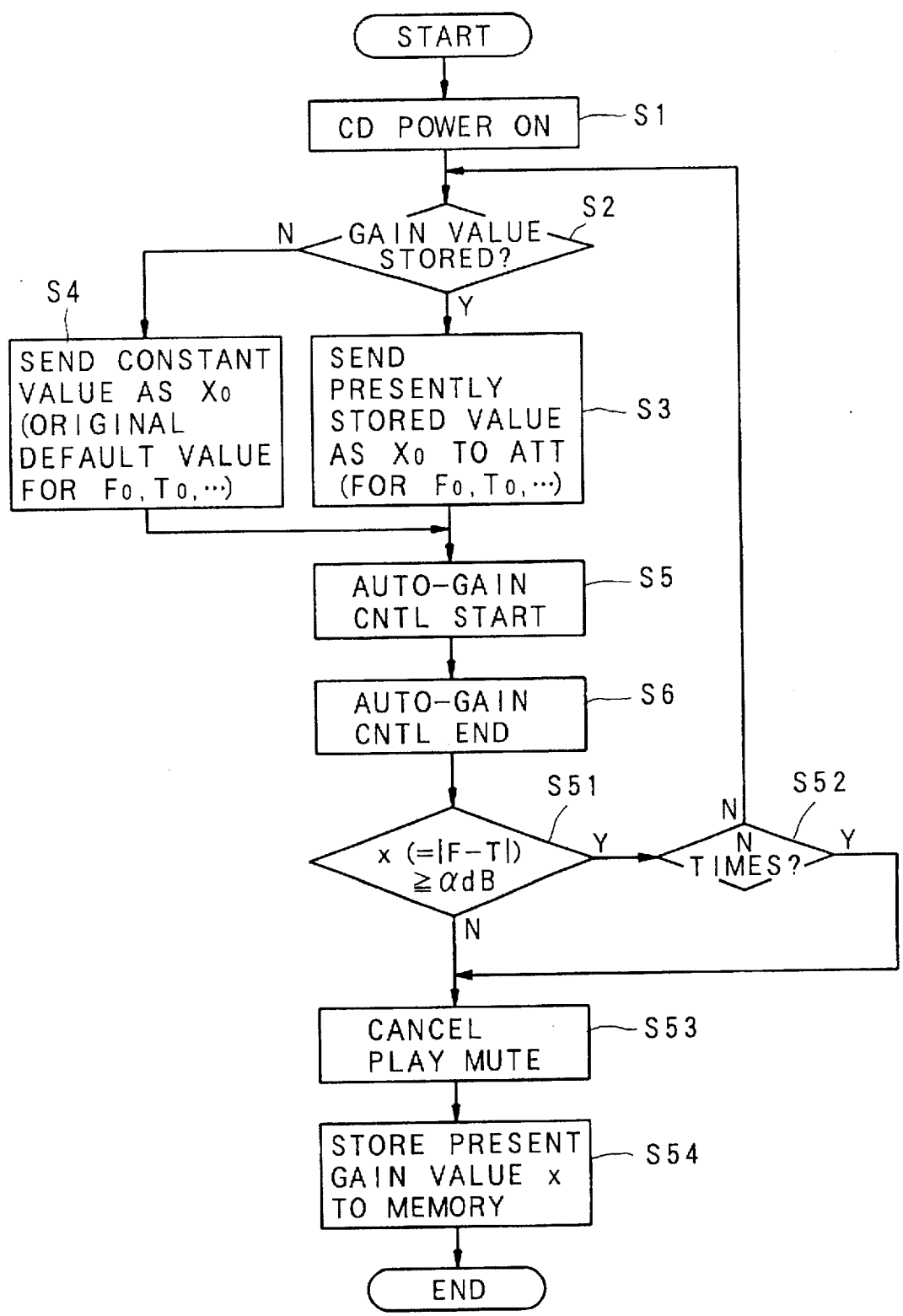
FIG. 7 is a flow chart showing an operation of a fourth embodiment of the present invention.

The operation of the fourth embodiment will be explained hereinbelow with referring to a flow chart of FIG. 7. In FIG. 7, the same steps as those in FIG. 3 carry the same step numbers, and the detailed explanations thereof are omitted.

In FIG. 7, the same steps S1 to S6 as those in the first embodiment of FIG. 3 are performed. After finishing the automatic gain controlling operation at the step S6, it is judged whether or not the present difference value x (=|F-T|) between the presently controlled gain value F for focusing servo and the presently controlled gain value T for tracking servo, which are obtained by the automatic gain controlling operation at the latest (at the steps S5 and S6), is equal to or greater than a predetermined value α [dB] (step S51). As the value a, a value in a range from about 6 to 12 [dB] may be adopted, which is determined in accordance with the specification of the apparatus. Here, if the present difference value x is judged to be equal to or greater than the predetermined value α [dB] (step S51: YES), since at least one of the presently obtained gain values F and T are supposed to be significantly different from the corresponding one of the predetermined gain values $F_0$ and $T_0$ set in advance, the flow branches to a step S52, where it is judged whether or not the automatic gain controlling operation (the steps S5 and S6) has been performed N times (step S52). This judgment is, for example, performed by a counter for counting the number of times of the comparing and judging operation. At the step S52, if it is not judged to be performed N times (step S52: NO), the flow returns to the step S2, and the automatic gain controlling operation is repeatedly performed. On the other hand, if it is judged to be performed N times (step S52: YES), the presently controlled gain values F and T, which are obtained by the latest automatic gain controlling operation (at the steps S5 and S6) (i.e. after N times of the controlling operation), or the average value of the gain values F and the average value of the gain values T of N times of the controlling operation, are respectively adopted as the effective gain values to be actually used for starting the reproducing operation, and the flow branches to the step S53.

At the step S51, if the present difference value x is judged to be less than the predetermined value α [dB] (step S51: NO), since both of the presently obtained gain values F and T are supposed to be similar to the predetermined gain values $F_0$ and $T_0$ set in advance respectively, while the presently controlled gain values F and T are respectively adopted as the effective gain values to be actually used for starting the reproducing operation, and the flow branches to the step S53.

At the step S53, a mute signal to mute the play i.e., to stop the reverse-quantized output to the audio signal system, is canceled, and the reproduction of the music is started. Then, the presently controlled gain values F and T confirmed through the steps S5 to S51 are stored to predetermined addresses respectively of the memory 13, and the operation is ended (step S54).

It is possible to construct the fourth embodiment such that, when the automatic gain controlling operation is performed N times at the step S52 (step S52: YES), the reproducing operation of the CD is stopped and the error display is performed since there is an abnormality or failure in the CD player (abnormal end), in the same manner as the second embodiment.

As described above in detail, according to the fourth embodiment, it is possible to check whether at least one of the presently controlled gain values F and T is erroneous or both are correct, by comparing the present difference value x of the presently controlled gain values F and T with the predetermined value α, which is set in advance. Namely, by performing just one comparison between the present difference value and the predetermined value, the judgments for both of the focusing and tracking servos can be performed at once. Accordingly, the fourth embodiment is quite advantageous in simplifying the calculation process.

Other Modified Embodiment

The present invention is not limited to the above explained first to fourth embodiments, but can be adapted to various types of the automatic gain control apparatus.

For example, if the difference between the gain, which is obtained as a result of the measurement of the loop gain by the automatic gain controlling operation and is set at the attenuator, and the previously adopted gain value becomes smaller than a predetermined value, the automatic gain controlling operation may be omitted after that time. On the other hand, it is safe to equip a limitter with respect to the previously adopted gain values, to exclude an abnormal gain value, which has been obtained and adopted in the previous operation and is presently stored in the memory, since the CD set at the time of the previous operation was defective.

Further, although only the previously adopted gain value or the default value is stored in the memory in the above embodiments, a plurality of memories may be equipped so that many gain values adopted in the past (e.g. in the past several times of operations) can be stored therein, which can be practically realized by use of a ring buffer. In this case, the average value of the gain values adopted at the past several times of operation may be set as the default value. And that, the average value of the gain values from which an abnormal gain value, which is outstandingly different from other gain values as a result of a reproduction of an abnormal CD, may be preferably excluded in the calculation of the average by use of the limitter.

Furthermore, the present invention is not limited to the servo control by means of the external disturbance signal. For example, the present invention can be adapted to the optical disc player in which the servo gain is determined by evaluating the record standard signal itself which is other than the external disturbance signal.

The above described embodiments were explained as for a general CD player, the present invention can be adapted to an on-vehicle type CD player, a portable type CD player, and any other types of CD players. Further, as long as an optical disc player is a type to perform the servo control by use of error signals, the present invention can be adapted to any types of optical disc players, such as an LD player, a DVD player and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An automatic gain control apparatus for an optical disc player, equipped in a servo loop to perform a servo control by use of an error signal in the optical disc player, said apparatus comprising:

a gain control means for controlling a gain of the servo loop to have a controlled gain value corresponding to a signal level of the error signal in one series of automatic gain controlling operation;

a memory for storing the controlled gain value as a previously controlled gain value in said one series of automatic gain controlling operation;

a comparison means for comparing the previously controlled gain value, which is stored in said memory, with a presently controlled gain value of the gain of the servo loop, which is presently controlled by said gain control means in another series of automatic gain controlling operation after said one series of automatic gain controlling operation; and a controller for instructing said gain control means to control the gain of the servo loop again if a difference between the previously controlled gain value and the presently controlled gain value is not less than a predetermined value according to a comparison result of said comparison means in said another series of automatic gain controlling operation.

2. An apparatus according to claim 1, wherein said controller comprises means for instructing said gain control means to stop controlling the gain of the servo loop if the difference between the previously controlled gain value and the presently controlled gain value is not less than the predetermined value even after said gain control means has controlled the gain of the servo loop by predetermined times in said another series of automatic gain controlling operation, and said apparatus further comprises a display means for displaying a message to inform that an operation is stopped.

3. An apparatus according to claim 1, wherein said controller comprises:

means for instructing said gain control means to stop controlling the gain of the servo loop if the difference between the previously controlled gain value and the presently controlled gain value is not less than the predetermined value even after said gain control means has controlled the gain of the servo loop by predetermined times in said another series of automatic gain controlling operation;

means for calculating an average of presently controlled gain values of the gain of the servo loop controlled by the predetermined times in said another series of automatic gain controlling operation; and means for setting the calculated average as the presently controlled gain value to said gain control means and storing the calculated average to said memory in said another series of automatic gain controlling operation.

4. An apparatus according to claim 1, wherein said controller comprises:

means for instructing said gain control means to stop controlling the gain of the servo loop if the difference between the previously controlled gain value and the presently controlled gain value is not less than the predetermined value even after said gain control means has controlled the gain of the servo loop by predetermined times in said another series of automatic gain controlling operation; and means for setting the latest presently controlled gain value to said gain control means and storing the latest presently controlled gain value to said memory in said another series of automatic gain controlling operation.

5. An apparatus according to claim 1, wherein said gain control means uses the previously controlled gain value, which is stored in said memory, as an initial value of the gain of the servo loop in said another series of automatic gain controlling operation.

6. An apparatus according to claim 1, wherein the error signal comprises a focusing error signal.

7. An apparatus according to claim 1, wherein the error signal comprises a tracking error signal.

8. An automatic gain control apparatus for an optical disc player, equipped in servo loops to perform servo controls by use of at least two error signals in the optical disc player, said apparatus comprising:

a gain control means for controlling gains of the servo loops to have controlled gain values corresponding to signal levels of the error signals respectively in one series of automatic gain controlling operation;

a memory for storing the controlled gain values as previously controlled gain values respectively in said one series of automatic gain controlling operation;

a comparison means for comparing a first difference between the previously controlled gain values, which are stored in said memory, with a second difference between presently controlled gain values of the gains of the servo loops, which are presently controlled by said gain control means in another series of automatic gain controlling operation after said one series of automatic gain controlling operation; and a controller for instructing said gain control means to control the gains of the servo loops again if a difference between the first difference and the second difference is not less than a predetermined value according to a comparison result of said comparison means in said another series of automatic gain controlling operation.

9. An apparatus according to claim 8, wherein the error signals comprise a focusing error signal and a tracking error signal.

10. An automatic gain control apparatus for an optical disc player, equipped in servo loops to perform servo controls by use of at least two error signals in the optical disc player, said apparatus comprising:

a gain control means for controlling gains of the servo loops to have controlled gain values corresponding to signal levels of the error signals respectively in one series of automatic gain controlling operation;

a comparison means for comparing the controlled gain values with each other in said one series of automatic gain controlling operation; and a controller for instructing said gain control means to control the gains of the servo loops again if a difference between the controlled gain values is not less than a predetermined value according to a comparison result of said comparison means in said one series of automatic gain controlling operation.

11. An apparatus according to claim 10, wherein the error signals comprise a focusing error signal and a tracking error signal.

* * * * *